United States Patent [19]
Volkmann et al.

[11] Patent Number: 5,937,831
[45] Date of Patent: Aug. 17, 1999

[54] METHOD OF CONTROLLING A SUPERCHARGED INTERNAL COMBUSTION ENGINE

[75] Inventors: Hans-Joachim Volkmann, Stuttgart; Hans-Hermann Bernd, Filderstadt; Wolfgang Widmann, Erdmannhausen; Roland Kemmler, Stuttgart, all of Germany

[73] Assignee: Mercedes-Benz AG, Stuttgart, Germany

[21] Appl. No.: 08/706,734

[22] Filed: Sep. 9, 1996

[30] Foreign Application Priority Data

Sep. 11, 1995 [DE] Germany .......................... 195 33 333

[51] Int. Cl.$^6$ .................................................. F02D 23/00
[52] U.S. Cl. ........................................ 123/559.3; 123/564
[58] Field of Search .................................. 123/559.3, 564

[56] References Cited

U.S. PATENT DOCUMENTS

| | | |
|---|---|---|
| 4,508,090 | 4/1985 | Rembold . |
| 4,589,396 | 5/1986 | Tokushima et al. . |
| 5,423,392 | 6/1995 | Kobayashi et al. . |

FOREIGN PATENT DOCUMENTS

| | | |
|---|---|---|
| 32 46 855 | 7/1983 | Germany . |
| 35 06 235 | 9/1985 | Germany . |
| 35 12 281 | 10/1986 | Germany . |
| 36 33 405 | 4/1989 | Germany . |
| 41 03 747 | 8/1992 | Germany . |
| 41 10 599 | 2/1993 | Germany . |
| 32 41 024 | 5/1994 | Germany . |
| 44 08 765 | 9/1994 | Germany . |
| 59-070829 | 4/1984 | Japan . |
| 61-031622 | 2/1986 | Japan . |
| 63-038614 | 2/1988 | Japan . |

OTHER PUBLICATIONS

H. Kochs et al., "Der Neue 1.8 Liter G–60–Motor IM VW Corrado", *MTZ Motortechnische Zeitschrift 49*, 1988, pp. 499–505.

*Primary Examiner*—Michael Koczo
*Attorney, Agent, or Firm*—Klaus J. Bach

[57] ABSTRACT

In a method of controlling a supercharged internal combustion engine of a motor vehicle wherein the engine includes a supercharger operated by the engine by way of a clutch and a return air flow duct including a return air flow control value is provided for returning air from the charger outlet side back to the charger inlet side and wherein the engine includes an engine control unit for controlling operation of the engine on the basis of a plurality of sensor values, the return air flow control valve and the charger clutch are controlled depending on operating parameters of the engine and of the motor vehicle so as to achieve various engine operating conditions and a certain vehicle behavior under certain vehicle operating conditions.

7 Claims, 4 Drawing Sheets

METHOD OF CONTROLLING A SUPERCHARGED INTERNAL COMBUSTION ENGINE

BACKGROUND OF THE INVENTION

The invention resides in a method of controlling a supercharged internal combustion engine with a supercharger which includes a clutch by which the charger can be activated or idled depending on engine operating conditions.

DE 35 06 235 A1 discloses an arrangement for controlling the intake air flow for an internal combustion engine. The arrangement comprises a charger for feeding the intake air to the internal combustion engine by way of an intake air duct which includes a throttle valve and from which, upstream of the throttle valve and downstream of the charger, a bypass air duct branches off which leads to the suction side of the charger and includes a by-pass air control valve. Furthermore, there is provided between the pressure side of the charger and an exhaust gas pipe of the internal combustion engine, a connecting line through which fresh air can be blown into the exhaust pipe under the control of a control valve which is arranged in the connecting line and which is controlled by an engine control unit. The engine control unit is further connected to a fuel injection system and an oxygen sensor arranged in the exhaust system of the internal combustion engine. The bypass air control valve is connected, by way of a linkage, to the throttle valve in such a way that the bypass air control valve is fully open when the throttle valve is closed and is closed when the throttle valve is fully open.

For general background information, reference is made to DE OS 32 46 855 A1, DE 35 12 281, DE 41 03 747 A1 and DE 41 10 599 C1.

It is the object of the present invention to provide a method of controlling a supercharged internal combustion engine by which a multitude of operating states of the internal combustion engine can be attended to in a simple manner.

SUMMARY OF THE INVENTION

In a method of controlling a supercharged internal combustion engine of a motor vehicle wherein the engine includes a supercharger operated by the engine by way of a clutch and a return air flow duct including a return air flow control value is provided for returning air from the charger outlet side back to the charger inlet side and wherein the engine includes an engine control unit for controlling the operation of the engine on the basis of a plurality of sensor values, the return air flow control valve and the charger clutch are controlled depending on operating parameters of the engine and of the motor vehicle so as to achieve various engine operating conditions and a certain vehicle behavior under certain vehicle operating conditions.

With the method according to the invention the engine can be controlled in a simple manner during various different operating states only by a control of the bypass air control valve and/or the charger clutch in dependence on operating parameters of the engine and/or the vehicle such that the driving comfort is increased.

Various operating states are for example, cruise control operation, recognition of cylinder knocking, top speed control, activation of secondary air admission to the exhaust gas flow, torque control with traction control systems, self-diagnosis, etc.

Operating parameters of the internal combustion engine or the vehicle which are supplied to the engine control unit by sensors and their signal lines are, for example: vehicle speed, desired vehicle speed with cruise controls, recognized engine knocking, air mass flow, throttle valve position, engine rpm, engine temperature, idle contact, and desired torque with traction control systems.

If, during cruise control operation of a vehicle, the charger clutch is constantly engaged when the vehicle is operated above a certain speed threshold, the switching on and off of the charger clutch which is noticeable for the occupants of a vehicle is avoided while the vehicle cruises at a speed above the speed threshold.

Upon recognition of knocking of the engine the ignition timing is retarded and the return air control valve is opened. The amount by which the return air flow control valve is opened is determined from a knocking sensor signal arithmetic average taken over all the engine cylinders, but it can be derived also in another way with adaptive antiknock control arrangements.

If above a certain engine speed threshold value and a certain engine speed gradient and with the engine idle contract closed, the return air control valve is opened to a certain position, the vehicle transitions from pulling (vehicle is driven by the engine) to pushing (engine is driven by vehicle momentum), the development of pressure peaks in the intake duct is avoided.

With an arrangement wherein, after a period in which the engine is driven by vehicle momentum, the charger clutch is firmly re-engaged only after combustion has been re-established, the engagement jerk of the charger will not occur during idle and is therefore less noticeable. Alternatively, charger engagement can be controlled by means of a current controlled output stage for the energization of the charger clutch or by a defined adaptation of the throttle valve position if a drive-by-wire system is used.

The invention will become more readily apparent from the following description of embodiments thereof explained on the basis of the accompanying drawings.

DESCRIPTION OF PREFERRED EMBODIMENTS

Figure 1:
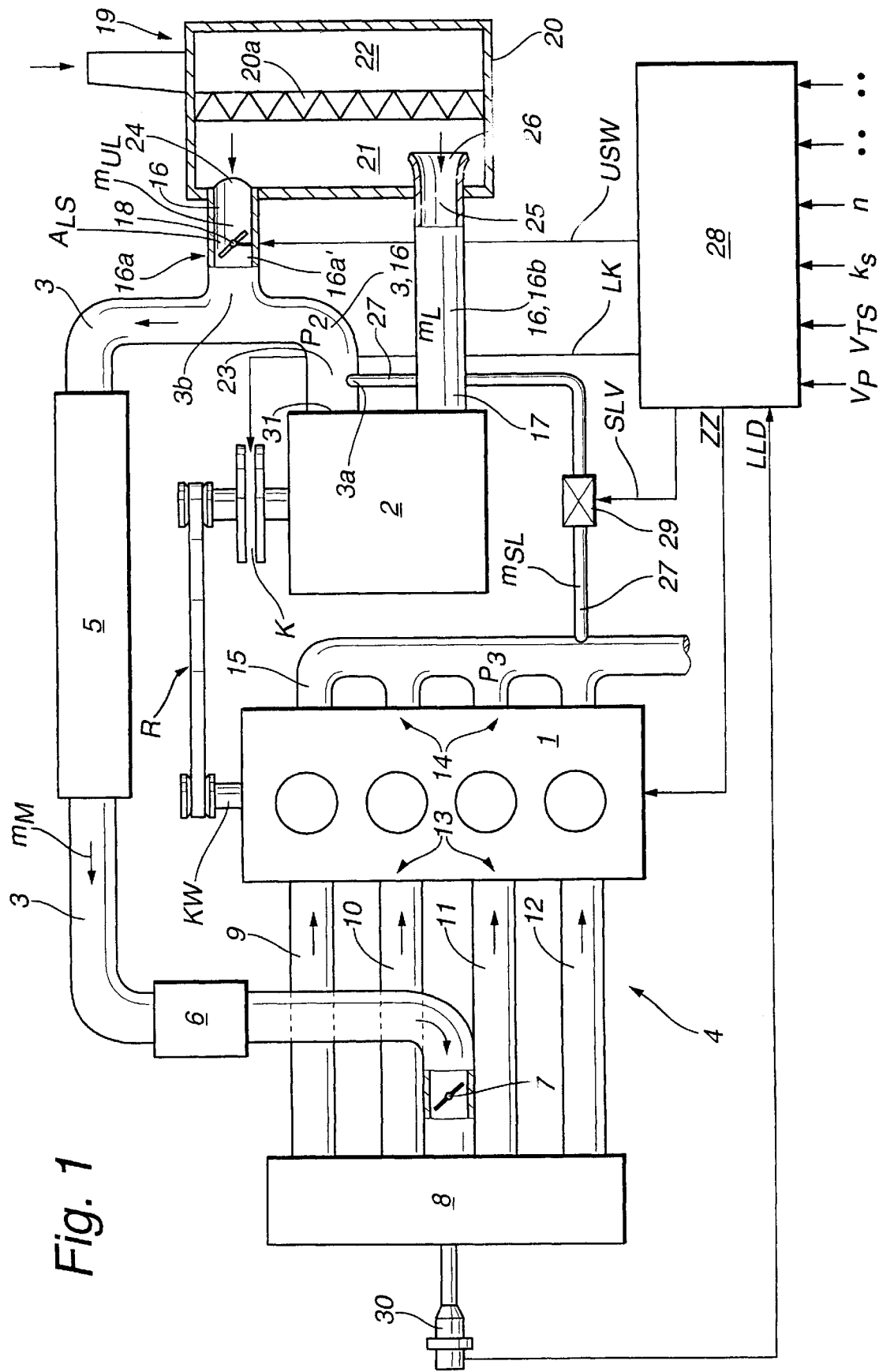
FIG. 1 is a schematic view of an arrangement for performing the method according to the invention, including an internal combustion engine, a charger, an engine control unit, a return air duct extending between the pressure side and the suction side of the charger, a return air flow control valve arranged in the return air duct and a connecting line extending from the pressure side of the charger to the exhaust pipe of the engine.

To facilitate the understanding of the invention, an arrangement for performing the method according to the invention is shown only schematically in FIG. 1. As indicated in FIG. 1, the arrangement for controlling the charge air flow for a supercharged internal combustion engine 1 includes a charger 2 for feeding charge air via a charge air duct 3 to an engine air intake system 4. The charger 2 is driven by the crankshaft KW of the engine 1 via a V-belt drive R including a mechanical clutch K.

The charge air duct 3 includes, downstream of the charger 2, a charge air cooler 5, an air flow meter 6 and a throttle valve 7. The charge air duct 3 leads to a collection chamber 8 of the air intake system 4 from which the various intake air ducts 9, 10, 11, and 12 extend to the intake side 13 of the internal combustion engine 1. The air mass flow meter 6 is arranged in the charge air duct 3 downstream of the charge air cooler 5 and upstream of the throttle valve 7.

From the exhaust side 14 of the engine 1 an exhaust pipe 15 leads to an exhaust system of the engine 1, the exhaust system not being shown in the drawings.

Downstream of the charger 2, an air return duct 16a is connected to the charge air duct 3 which extends to the suction side of the charger, that is back to an air filter housing 20 to return compressed air to the suction side of the charger 2. The return air duct 16a includes a return air flow control valve 18 for controlling the return air discharge from the charge air duct 3. The return air flow path 16 extends through an intake air duct portion 16b the compressor 2, a portion of the charge air duct 3 the return air duct 16a and the filtered air side 21 of an air filter 19 which includes an air filter housing 20 with a filter 20a dividing the air filter housing 20 into a filtered air side 21 and an unfiltered air side 22. The suction side 17 of the charger 2 and the discharge side 31 of the charger are in communication with the air filter housing 20 via the flow path portions 16b and 16a, respectively. The jointure 24 of the return air duct 16a extending from the pressure side 23 of the charger and the jointure 25 of the suction duct 16b with the air filter housing 20 are disposed at the filtered air side of the air filter housing 20. The return air flow accordingly passes through the filtered air side 21 of the air filter 19. At the entrance end 25 of the flow duct portion 16b in the air filter housing 20, there is a flow enhancing conical intake duct portion 26.

A connecting pipe 27 branches off the duct 3 and leads to exhaust pipe 15 of the engine 1. The connecting pipe 27 includes a control valve 29 which is controlled by a motor control unit 28. The connecting pipe 27 is connected to the charge air duct at a location 3a upstream of the location 3b at which the return duct section 16a joins the charge air duct 3.

The return air flow control valve 18 is a fast acting valve which can switch from an open to a closed position and vice versa within a very short time of about 50 to 100 milliseconds. Nevertheless, the return air flow control valve 18 is finely adjustable. It can be in the form of a flap, a slide valve or a rotary valve. Preferably, it is operated by an electric motor (not shown) which is controlled by the engine control unit 28 and which can operate the valve at high speed so as to realize the short control times (the electronic circuit of the integrated valve position control circuit for the return air flow control valve is preferably arranged directly adjacent the valve).

The return air flow control valve 18 is further provided with a device for long term adaptation as a complete characteristic field for the setting of the position of the return air flow control valve 18 dependent on load and engine speed is deposited in the engine control unit 28 and also the end positions of the return air flow control valve 18 which change with the life of the engine are stored in an EEPROM (electronically erasable programmable read only memory).

Figure 2:
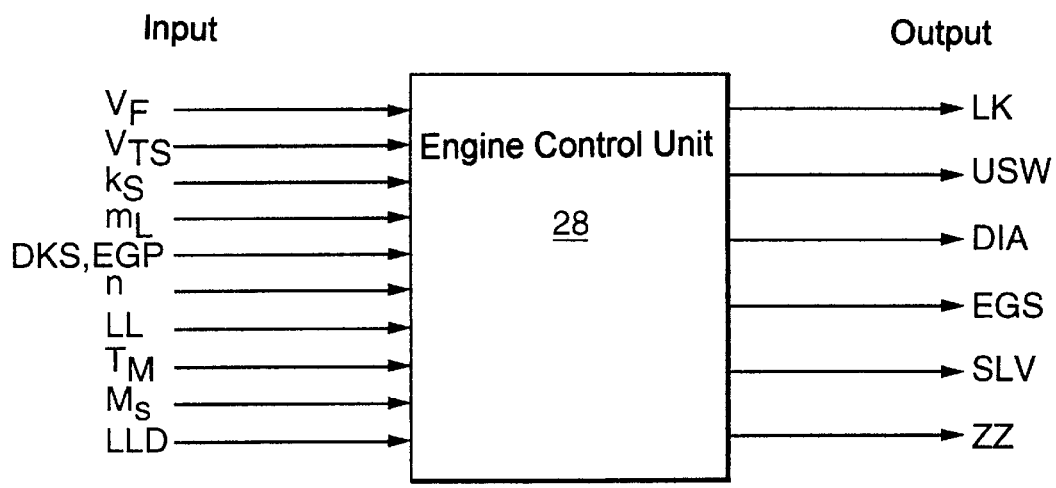
FIG. 2 shows schematically the engine control unit of FIG. 1 with the various inputs and outputs.

The engine control unit 28 (see also FIG. 2) receives and processes a multitude of sensor signals which are converted to control data for the operation of the internal combustion engine 1 and which are transmitted to the engine by communication lines. The engine control unit 28 addresses a degree of opening USW of the return air flow control valve 18 (that is, the opening angle if the valve is a butterfly valve) and/or an operating state of LK of the charger clutch K for predeterminable different operating conditions of the internal combustion engine to predeterminable values depending on operating parameters of the engine.

The following sensor values are received by the engine control unit 28: a vehicle speed $V_F$, a cruise control setting value $V_{ts}$, knocking of one or several cylinders of the internal combustion engine $k_s$, an air mass flow $m_L$, a throttle valve position DKS, or with fuel injection, an fuel injection control position EGP, and engine speed n, an idle position stop LL, and engine temperature (coolant temperature) $T_M$ and a desired torque $M_s$. In addition, the engine control unit 28 may also be connected to a pressure sensor 30 which senses the charge air pressure LLD in the collection chamber 8 of the air intake system 4.

After processing the input data, the engine control unit 28 transfers, via respective communication lines, values SLV for a secondary air function to the control valve 29 (open/close the valve), values for the degree of opening USW of the return air flow control valve 18 (for example, air flow control valve opening angle), values LK (disengaging/re-engaging) for the charger clutch K, values EGS for a correction of the fuel injection control unit and values DIA for a self-diagnosis of the system.

Below, some examples for the control of the return air flow control valve and/or the charger clutch K are given in dependence on various operating states of the internal combustion engine.

Figure 3:
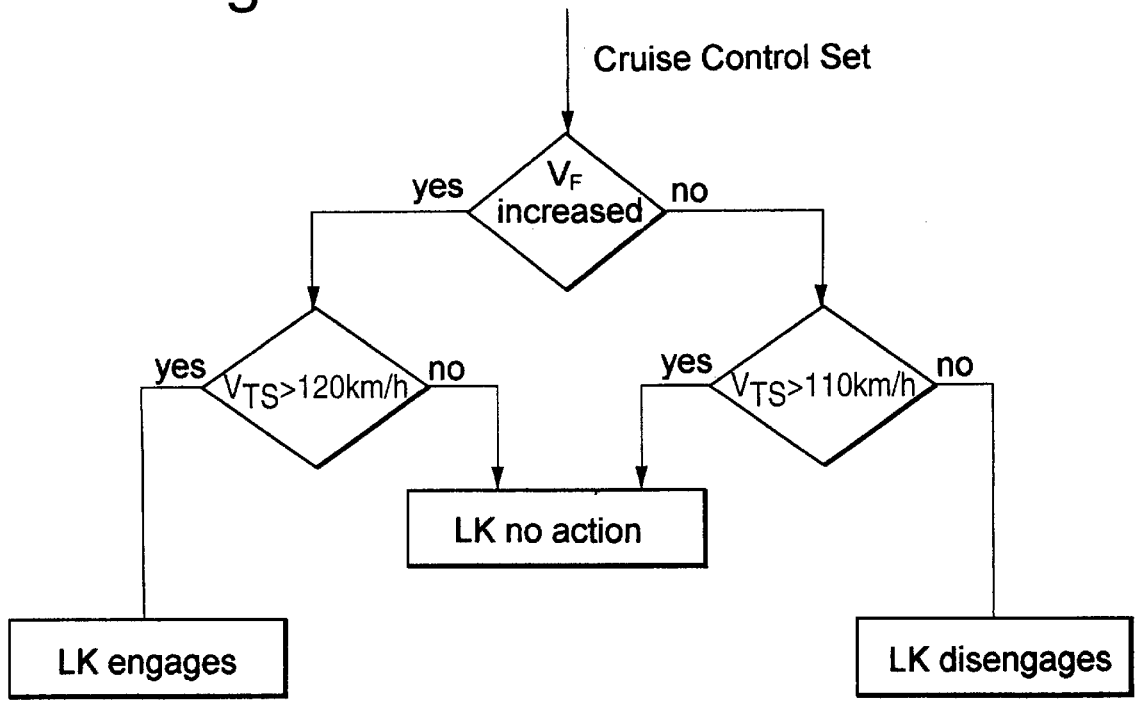
FIG. 3 shows a first exemplary flow diagram for the control of the charger clutch during cruise control operation.

FIG. 3 shows a flow diagram for a charger/clutch control strategy during operation of a vehicle with cruise control. With the cruise control activated, the charger clutch K remains engaged if the vehicle speed $V_F$ is increasing and the cruise control is set at desired speed $V_{ts}$ of more than 120 km/hr. If $v_F$ increases but $v_{TS}$ falls or remains the same, the charger clutch remains undisturbed. Also, if $V_F$ remains the same or falls and $V_{ts}$ is greater than 110 km/hr, the charger clutch remains undisturbed, otherwise the charger clutch is disengaged. To prevent engagement and disengagement jerks, which are caused by the inertia of the mechanical charger 2, the mechanical clutch K of the charger remains engaged when the cruise control is activated at a vehicle speed above a preferably hysteresis-like speed threshold (different settings for $V_{ts}$ depending o the vehicle speed $V_F$). The values for $V_{ts}$ can be freely selected and may be, after a $V_F$ value is called up, the same for both possibilities (increasing or decreasing vehicle speed $V_F$).

Figure 4:
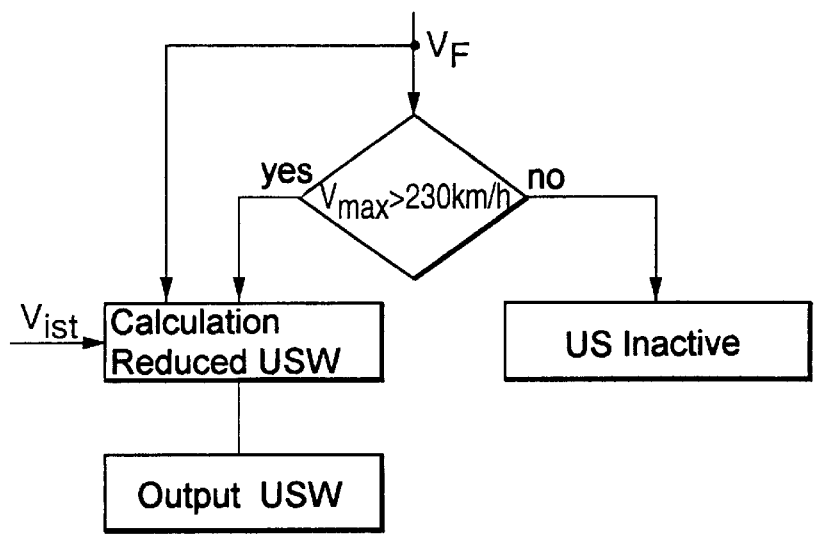
FIG. 4 shows a second exemplary flow diagram for the control of the opening angle of the bypass air flow control valve for top speed control.

FIG. 4 shows a flow diagram for the control of an opening angle USW of the return air flow control valve 18 during a top speed control. A predetermined maximum speed of the vehicle (for example, $V_{max}$=230 km/hr) is controlled exclusively by way of the opening angle USW of the return air flow control valve 18. If this particular function is activated, a setting value for the position control circuit for adjusting the opening angle USW of the return air flow control valve 18 is calculated from the difference between the maximum speed $V_{max}$ and an actual speed $V_{ist}$ by a control algorithm.

Figure 5:
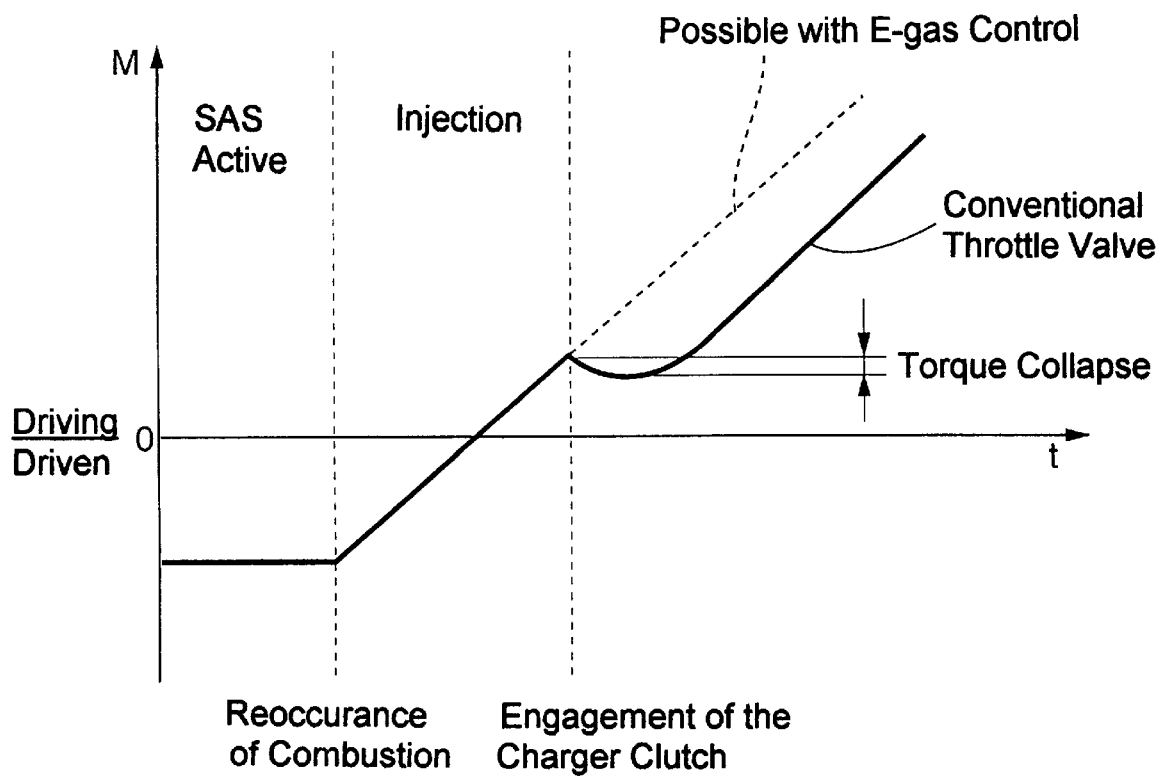
FIG. 5 shows a third exemplary flow diagram for the engagement of the charger clutch during the transition from an engine driven state to an engine driving state.

FIG. 5 is a diagram showing the engine drive torque over time for the engagement of the charger clutch K during transition from engine driven operation to engine driving operation of the vehicle. In order to minimize the engagement jerk of the charger clutch K upon engagement (SAS) of the clutch after engine driven operation, the charger clutch is engaged only after engine combustion operation has restarted. Alternatively, the engagement can be established by way of a current controlling final stage for controlling the charger clutch K or, if a drive-by-wire system is utilized by way of a well defined influencing of the throttle valve angular position.

Figure 6:
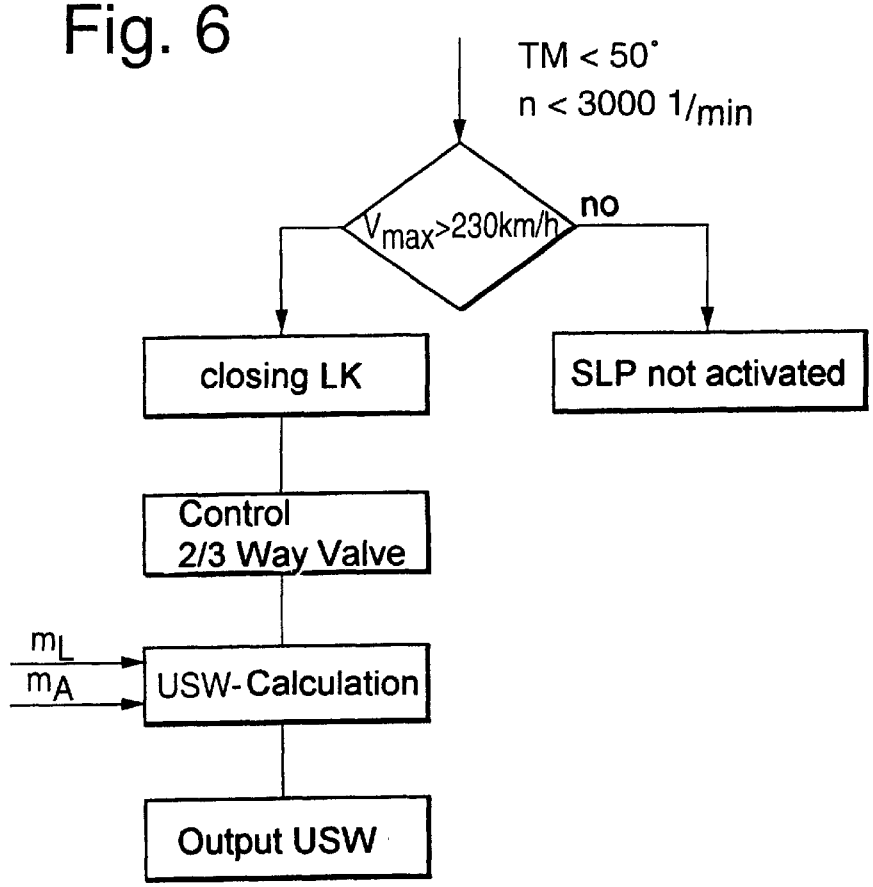
FIG. 6 shows a fourth exemplary flow diagram for a control of the opening angle of the return air flow control valve when air is supplied to the exhaust gas pipe.

FIG. 6 is a flow diagram for controlling the opening angle USW of the return air flow control valve 18 during the delivery of secondary air to the exhaust pipe. The control of the secondary air mass flow $m_{sl}$ through the connecting pipe 27 is achieved by a fine control of the return air flow control valve 18. The mass flow $m_{sl}$ through the charger 2 comprises the mass flow $m_M$ through the internal combustion engine 1, the return air mass flow $m_{ul}$ through the return air duct 16 and the secondary air mass flow $m_{sl}$ through the connecting pipe 27 ($m_l=m_{ul}+m_{sl}$). The condition for the secondary air injection into the exhaust pipe 15 is that the pressure $p_2$ of the charge air after the charger is greater than the exhaust gas pressure $p_3$ in the exhaust pipe 15, the pressure $p_2$ being a function of the open flow cross-section $A_{ls}$ through the return air flow control valve 18 in the return air duct 16. A further condition is that the engine temperature is above a predetermined threshold value (for example, 50° C.) and the engine speed n is above a certain value (for example, 3000 rpm).

After activation of the secondary air injection function (SLP- function) the control valve 29 (⅔ way valve) in the connecting pipe 27 is actuated. The oxygen content required in the exhaust gas for the SLP function is realized by way of an excess pressure LLD in the intake air duct (pressure sensor 30) depending on the momentary operating condition of the internal combustion engine, a particular excess pressure LLD corresponding to a particular opening degree USW of the return air flow control valve 18 being stored in a characteristic graph.

For each operating point of the internal combustion engine ($m_L$ and $m_M$ are constant), the secondary air mass flow $m_{sl}$ can be optimized by variation of the return air mass flow $m_{ul}$ and, consequently, the pressure $p_2$. In this way, a complete characterization field for the position (for example, valve flap angle) of the return air flow control valve 18 depending on engine load (throttle valve opening angle) engine speed and cooling water temperature can be recorded in the engine control unit 28. By long term adaptation within the control device for the return air flow control valve 18 (learned stop positions for the valve are recorded in the EEPROM), a consistent operation of the system is possible over the life of the engine, since for example soiling of the control structure is recognized and is compensated for.

Figure 7:
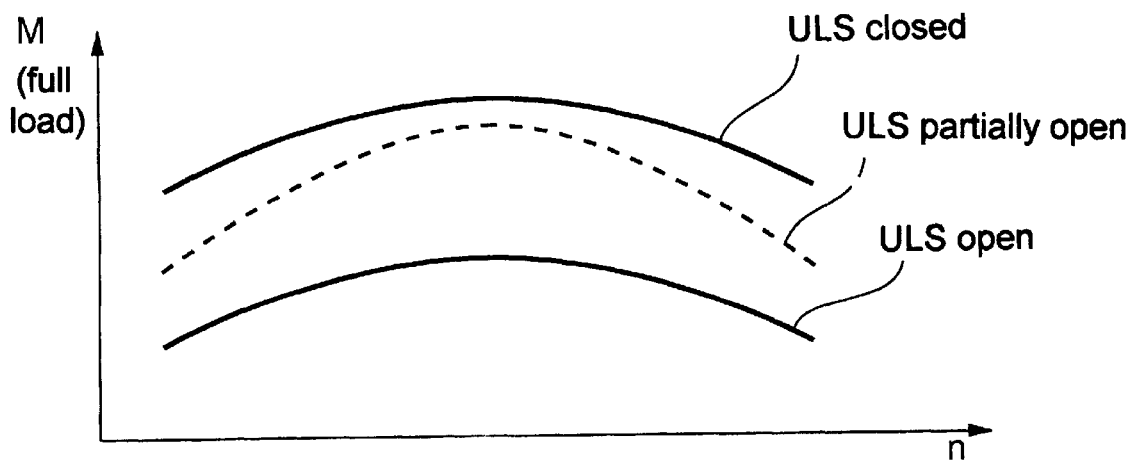
FIG. 7 shows the torque distribution depending on engine speed (rpm) of the engine with the return air flow control valve closed and open.

FIG. 7 shows a diagram for the drive torque M dependent on the speed of the engine for a closed and an open return air flow control valve 18. Every momentary torque reduction (for example, for the protection of the transmission during shifting or for traction control purposes) is achieved and controlled by controlling the opening USW of the return air flow control valve 18. To increase the speed of the torque reduction, the ignition timing may be retarded at the same time.

In a further example (not represented in the drawings), that is when knocking of one or more cylinders of the engine is recognized and consequently, the ignition timing is retarded, the opening degree USW of the return air flow control valve 18 can be inceased depending on the ignition retardation. The value for the retardation of the ignition timing for eliminating knocking of the engine is used as calculation basis for determining an increased opening degree USW of the return air flow control valve 18. The calculation of the opening degree USW is performed on the basis of an arithmetic average over all the cylinders or, with an adaptive antiknocking control, on the basis of a value which after a control step on the basis of an adapted value is instantaneously developed, on the basis of still existing knocking.

It is further possible to provide with the method according to the invention a chain action diagnosis. With the charger clutch K engaged and above a certain opening degree USW of the return air control valve 18, the air mass flow $m_L$ as measured by the air mass flow meter 6 is compared with an air mass flow $m_{NL}$ as it is recorded in a characteristic field diagram for engine suction operation under normalized conditions. If the differential air flow mass $m_D=m_L-m_{NL}$ is below a freely determinable limit, a defect in the charger circuit is recognized and a corresponding signal is provided.

From a comparison of the air mass flow $m_L$ as measured with normalized air mass flow $m_{NL}$, it is also possible to determine the geodetic height at which the vehicle is operated. The normalized air mass flow $m_{NL}$ (norm conditions) is recorded in two characteristic field diagrams, specifically in a characteristic field diagram for suction operation of the engine and in a characteristic field curve for charged operation of the engine, wherein the characteristics are given in the diagram over the throttle valve opening angle DKS and the engine speed n (rpm). If the ambient conditions differ from the normalized conditions, the ambient condition data are supplied to the engine control unit 28.

To avoid the development of pressure peaks in the intake duct, the opening degree USW of the return air flow control valve 18 is reduced from the full load position (in which the return air flow control valve is closed) by a predetermined amount (the return air flow control valve is partially opened) if the engine operates above a certain speed threshold and above a certain speed gradient. During vehicle operation transition phases from engine driving to engine driven operation, the return air flow control valve 18 is opened if an idle position stop contact LL of the throttle valve is closed in order to prevent the development of pressure peaks in the charge air duct 3.

In a preferred embodiment of the invention, all the above functions are implemented in a motor vehicle and all are controlled by the engine control unit 28.

What is claimed is:

1. A method of controlling a supercharged internal combustion engine of a motor vehicle with cruise control, wherein said engine includes a supercharger with an air inlet side and an outlet side for supplying charge air to said engine, said supercharger being operatively connected to said engine by way of a clutch which is engageable and disengageable depending on engine operating parameters and wherein a return air flow duct is provided downstream of said supercharger for returning charger air from the charger air outlet side to the air inlet side and a return air flow control valve is disposed in said return air flow duct for controlling the return air mass flow through said return air flow duct, said engine further including an engine control unit which receives a plurality of sensor values and which processes the sensor values to form control values for controlling the operation of the engine and supplies said control values to the engine by way of control lines, said method comprising the steps of:

supplying control values to said return air flow control valve and to said charger clutch in dependence on operating parameters of said engine and said motor vehicle for controlling the opening degree of said return air flow control valve and the engagement or disengagement of said charger clutch for various operating conditions of said internal combustion engine, wherein, after a return from an engine driven operating phase wherein combustion is interrupted, to an engine driving operating phase, said charger clutch is re-engaged only after combustion has resumed and with said cruise control activated, said charger clutch remains engaged above a certain vehicle speed threshold value.

2. A method according to claim 1, wherein said engine includes knocking sensors and said engine control unit provides for a retardation of the engine ignition timing if said knocking sensors sense the knocking of one or more cylinders and wherein said return air flow control valve is opened depending on the retardation of the ignition timing.

3. A method according to claim 1, wherein a settable maximum speed of the vehicle is controlled by controlling the opening degree of the return air flow control valve by calculating from the difference between the maximum vehicle speed and the momentary vehicle speed, by means of a control algorithm, a control value for the opening degree of the return air flow control valve.

4. A method according to claim 1, wherein, above a certain engine speed threshold value and above a certain engine speed gradient, the return air flow control valve is opened from a closed position to a certain opening degree.

5. A method according to claim 1, wherein, with engines having secondary air injection wherein air from the discharge side of the supercharger is injected into an engine exhaust pipe for increasing the oxygen content in the engine exhaust gas, the air flow from said discharge side of said supercharger to said exhaust pipe is controlled by controlling the opening degree of said return air flow control valve.

6. A method according to claim 1, wherein, for vehicles with traction control, the engine torque reduction required to maintain traction is controlled by controlling the opening degree of said return air flow control value.

7. A method according to claim 1, wherein, during supercharged operation of said engine when the return air flow control valve is above a predetermined opening degree (USM), an actual air mass flow ($m_L$) as measured is compared with a reference air flow mass($m_{NL}$) for engine suction operation and a defect in the charger circuit is determined and is indicated if the difference between the two air mass flows ($m_D = m_L - m_{NL}$) is below a certain value.

* * * * *